United States Patent [19]
Claxton et al.

[11] 3,955,970
[45] May 11, 1976

[54] CONTINUOUS MELTING OF ALUMINUM SCRAP

[75] Inventors: Raymond J. Claxton, Fox Chapel; Lee C. Blayden, New Kensington, both of Pa.

[73] Assignee: Aluminum Company of America, Pittsburgh, Pa.

[22] Filed: Apr. 8, 1974

[21] Appl. No.: 458,553

[52] U.S. Cl. .................................. 75/68 R; 75/63; 75/65 R; 75/93 R
[51] Int. Cl.² .......................................... C22B 21/06
[58] Field of Search ............. 75/68 R, 93 R, 93 AC, 75/63, 65, 65 R; 266/33 R, 33 S, 34 R, 34 A, 34 PP, 34 T

[56] References Cited
UNITED STATES PATENTS

| | | | |
|---|---|---|---|
| 3,649,247 | 3/1972 | Brondyke et al. | 75/93 AC |
| 3,650,730 | 3/1972 | Derham et al. | 75/68 R |
| 3,767,382 | 10/1973 | Bruno et al. | 75/68 R |

Primary Examiner—M. J. Andrews
Attorney, Agent, or Firm—Carl R. Lippert

[57] ABSTRACT

A continuous melting process wherein aluminum can scrap or other charge is introduced into a moving stream of superheated molten aluminum and thereby rapidly melted, the stream then being subjected to the fluxing action of a gaseous flux substantially immediately upon the melting of the charge. The gaseous flux comprises a non-reactive gas such as argon preferably along with a reactive chlorinaceous gas such as chlorine or another suitable halogen.

22 Claims, 2 Drawing Figures

CONTINUOUS MELTING OF ALUMINUM SCRAP

BACKGROUND OF THE INVENTION

In melting a solid aluminum charge it is known to introduce the charge into a body of molten aluminum which is preferable to heating the dry charge since better heat transfer is achieved this way and since high rates of oxidation can result from exposure of the solid aluminum surfaces to the oxidizing influence of combustion gases. It is also known to utilize a circulating system of hot molten metal to melt aluminum wherein heating is accomplished in one compartment or zone and the heated metal is circulated to a second compartment or chamber where the charge is introduced. These systems offer the promise of much higher melting rates and reduced melt loss and have recently been developed to a state where they reliably increase melt rates while reducing melt losses by oxidation.

With the increased emphasis on environment controls and energy conservation there has been an increasing desire to recycle aluminum scrap and particularly aluminum can scrap. However, the economic considerations in remelting large amounts of aluminum can scrap can become disadvantageous in view of substantial melt losses which, to date, have not been completely alleviated even in recirculating melting systems. One particular problem encountered in melting can scrap in addition to those normally associated with remelting relatively clean scrap material is that the can scrap, having gone through the cycle of packaging, consumer use, scrap collection, and the like, is highly contaminated. Typical contaminants include food and other residues from the can container contents, paint residues and dirt residues. Troublesome contaminants include titanium dioxide from the paint pigments employed in decorating aluminum cans and silicon dioxide and calcium oxide, obvious contents of dirt. In addition there are other elements introduced in recycling cans but the above-mentioned oxides, especially the titanium and silicon oxides, are particularly troublesome. The contaminants mentioned can be present in significant amounts, typically 1 to 2% $TiO_2$ and 2 to 4% $SiO_2$ based on the total weight of a can scrap charge, and since they are chemically reduced by molten aluminum, or magnesium often present in molten aluminum, can introduce elemental silicon and titanium into the melt. These contaminants are typically present in both lacquered and delacquered can scrap or other sheet scrap. Thus considering the case where titanium is involved, the titanium level in the melt can rise to 0.1% as a result of the reduction of titanium dioxide whereas many alloys have the titanium level controlled to less than 0.05 percent It further being remembered that titanium is often introduced just prior to casting as a grain refiner, the problem becomes further complicated in that titanium must be held at a level sufficiently below the maximum limit to admit these last minute additions without exceeding that limit. A similar situation applies to silicon in that while aluminum alloys have a greater tolerance for silicon than for titanium, exceeding that tolerance introduces problems with respect to composition control. As silicon and titanium are both difficult to remove by normal fluxing treatments, the choice in the industry has been to simply counteract their contaminating effect by the addition of copious amounts of a purer or cleaner grade of aluminum metal. However, this approach is somewhat self-defeating in that typically two to four times as much make-up metal must be added to counteract the contaminating effect of a given can scrap charge with its titanium and silicon contaminant introduction effect. Remembering the objectives in recycling scrap, the self-defeating aspect becomes immediately apparent.

In addition to the titanium and silicon dioxide problems the introduction of a more or less dirty can scrap has disadvantages from the standpoint of developing excessive skim. In addition to the metal lost in association with the skim, excessive skim can be disastrous in a recirculating melting system and cut its efficiency by almost 50 percent and even seriously damage equipment.

STATEMENT OF THE INVENTION

In accordance with the invention it has been found that the harmful effects of titanium dioxide and silicon dioxide and various other contaminants can be overcome provided that substantially immediately upon melting, the charge is fluxed with a non-reactive gas such as argon preferably along with a halogen gas, preferably a chlorinaceous gas such as chlorine.

DETAILED DESCRIPTION

In the following description, reference is made to the drawings in which.

Figure 1:
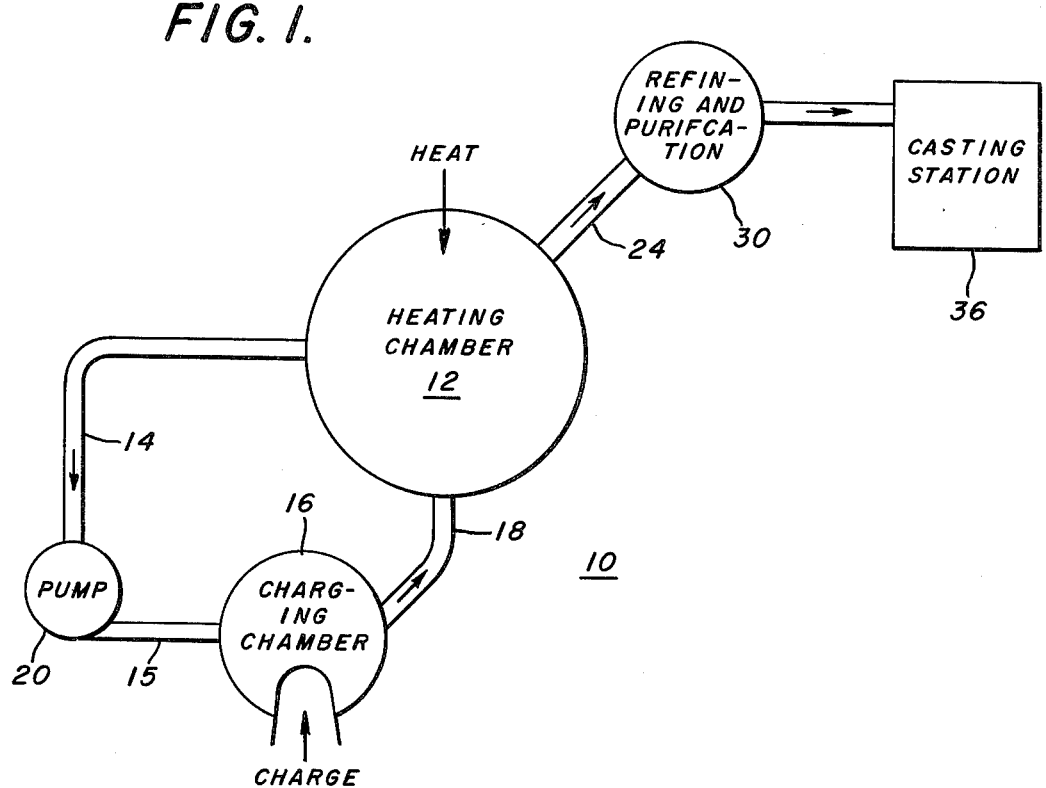
FIG. 1 is a schematic flow diagram illustrating a recirculating type charging and melting system together with associated casting operations.

Referring now to FIG. 1 there is illustrated a schematic flow diagram depicting a typical molten metal recirculating loop 10 used for melting a scrap charge. In this system molten metal is heated in heating chamber 12 and moves through line 14 to charging chamber 16 where it contacts the solid charge and melts it and the resulting combined melt passes through line 18 back to the heating chamber 12. A pump 20 can be situated in either line 14 or 18 in order to enhance circulation. Molten metal is continuously removed from the heating chamber 12 through line 24 at a rate commensurate with the charging rate and constitutes the product of the melting operation. That product can be subjected to further refining and purification treatments in a refining station 30 wherein suitable fluxing treatments may be employed such as those depicted in U.S. Pat. Nos. 2,863,558; 3,025,155; 3,039,864; 3,737,303; 3,737,304; and 3,737,305 and other known treatments to remove oxides and other non-metallic impurities, hydrogen gas and metallic impurities such as sodium or calcium. From the refining station 30 the molten metal is passed to a casting station 36 which can include batch or continuous systems of the type generally known in the art. This type of system is highly useful in economically melting scrap aluminum charges including scrap sheet charges at very high melting rates and has reached a stage of development where the economics are attractive and the systems have become reliable especially when skim generation in the heating chamber is minimized and surface turbulence through the system is minimized at those sites where air is present. However, as indicated earlier the presence of titanium and silicon dioxides, and to a lesser extent calcium oxide, in a scrap charge requires that substantial amounts of molten metal free of these contaminants be introduced in order to counterbalance the effect of their presence as contaminants in the product stream exiting through line 24. Also, dirty or contaminated particulate scrap in melting can cause substantial skim formation which interferes with efficient operation.

Figure 2:
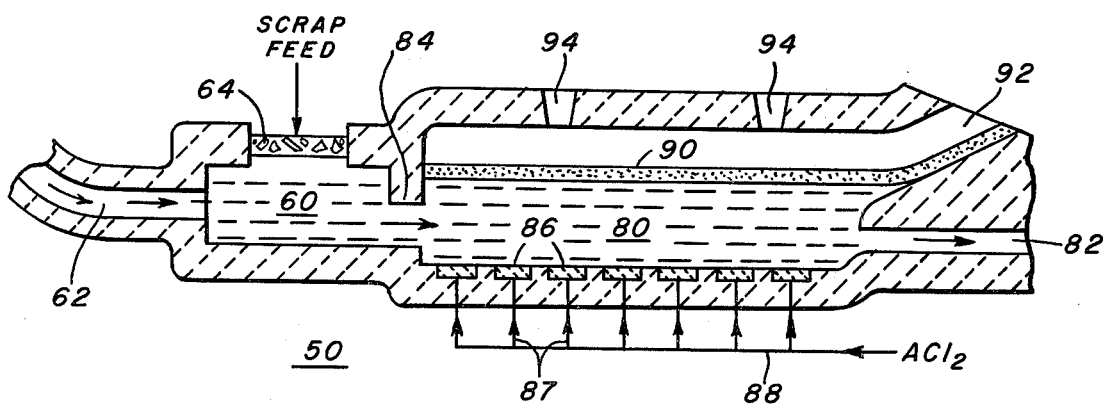
FIG. 2 is a schematic elevation in cross section illustrating the improved melting and treating system.

In accordance with the improvement and referring to FIG. 2, it has been discovered that the harmful effects mentioned are overcome by an uncomplicated and economical treatment whereby the scrap feed substantially immediately upon immersion or melting is subjected to a fluxing treatment by a gas flux comprising a non-reactive gas such as argon preferably along with a reactive chlorinaceous or other suitable halogen gas flux. Referring to FIG. 2 the improved melting system 50 includes a charging zone 60 immediately followed by a fluxing zone 80. A stream of molten metal is continuously passed through the charging zone 60 to rapidly melt a scrap charge feed introduced by immersion into molten metal moving through the charging zone and sweep it rapidly into the fluxing zone 80. Hence molten metal, in a superheated condition as explained hereinbelow, enters through introduction line 62 and moves through the charging chamber 60 where it very rapidly melts the charge and carries the liquified charge to the fluxing chamber 80 from whence it exits through discharge line 82.

In the charging zone 60 scrap charge or feed is forcibly submerged into the molten metal by any suitable means which may include manual or mechanical devices with puddling or other forced feed arrangements being useful such as a cascade where inlet stream 62 would be caused to fall upon scrap charge preferably in the presence of an inert atmosphere and thus submerge it. It is highly desirable that the scrap feed be forcibly submerged, and preferably quite rapidly, into the charging zone 60 through which the flow of superheated molten aluminum passes. Both the scrap feed and the flow are preferably continuous although the charge or feed can be interrupted. Any interruption here is itself a possible source of problems since, referring to the case of a recirculating melting system, the scrap feed functions as a heat sink and contributes to the heat balance of the system as a whole. Interrupting the scrap feed and continuing the heating in the heat zone or chamber obviously will raise the temperature of the molten metal which in turn can increase skim or oxide losses. Obviously continued charging during molten metal flow interruption can cause freezing.

The molten metal entering the charging zone in line 62 is superheated with respect to the melting point of the charge by which is meant it is controlled at a temperature above the melting point of itself and the charge. Thus when the charge is forcibly submerged in the moving super-heated metal it is rapidly melted without lowering the temperature of the molten metal to the point where the latter starts solidifying. This particular aspect can be important in modern recirculating loop type melting systems where the goal is to melt as much metal as possible in the shortest practical time and in a smooth trouble-free operation. Substantial amounts of solidification can reduce the melting rate and thus detract from the attractiveness of a loop system which, quite obviously, involves substantial capital expenditures over a single furnace type melting system, and this expenditure is justified only by a high melting rate. Thus it is essential that there be sufficient heat, either by way of metal volume or metal temperature, in the incoming molten metal to assure the desired melting. Quite obviously the heat requirements of melting the incoming charge or feed are balanced against the available heat, i.e. the sensible superheat in the molten metal and the rate of the molten metal stream. Where the extent of superheating is very great, less molten metal is required per unit of charge and where more molten metal is circulated, less superheating is required.

Referring to the use of molten aluminum, in a practical sense it is advisable to keep the extent of the superheating to only a few hundred degrees above its liquidus temperature, the temperature at which no portion of the metal is solid or non-liquid. One reason for this is that as the temperature of molten aluminum is increased its oxidation rate increases drastically thus generating larger amounts of skim which in turn not only result in melt losses, due to metal consumed by oxidation and entrainment in the resulting skim, but interfere with heating and other operations performed on the metal itself. The extent of superheat varies from about 100° to 300°F which places the temperature of the stream entering zone 60 at about 1300° to 1500°F, although temperatures as low as 1250°F or as high as 1600° or 1700°F are tolerable on a less preferred basis. While the liquidus temperature varies from one alloy to another, temperatures in line 62 of 1400° to 1450°F are preferred for most alloys. The temperature in the stream exiting zone 60 should not drop below 1250° or preferably 1300°F to avoid approaching solidification conditions.

The amount of molten metal typically at a temperature of about 1450°F introduced through line 62 amounts to approximately 10 to 50 times, and typically 15 to 25 times, the amount of can scrap feed into the charging zone 60 on a weight basis. While preferred ratios can vary depending on extent of superheat and other factors, the stated 15 to 25:1 ratio is suited to many situations.

As shown in FIG. 2 the molten aluminum passes from the charging zone to the fluxing zone 80 by moving beneath partial baffle 84 which separates the charging from the fluxing zone. As shown in the figure, a plurality of gas dispersers 86 are disposed along the bottom of the fluxing zone 80 and these dispersers are fed by individual pipes or channels 87 running from header or manifold 88 for conducting the gas flux to the dispersers. It is important in the practice of the invention that the charge substantially immediately upon immersion or liquification be exposed to the action of a gas flux and in this connection a number of considerations are important. First, the size of the charging zone 60 typically is relatively small in comparison with the fluxing zone 80, the volume of the former typically being only one-tenth to one-half that of the latter. More importantly, with respect to hold time the charging zone and the path to the fluxing zone are sized with respect to the molten metal moving therethrough such that the average or mean residence time of molten metal within charging zone 60 is such as to facilitate the desired rapid movement and transfer to the fluxing zone 80. Second, the path between the charging zone 60 and the fluxing zone 80 should be short for substantially the same reason as the size of the charging zone is limited, that being to help control the time between introduction and liquification of the scrap feed and its exposure to the fluxing action in fluxing chamber 80.

The molten aluminum moves through the charging zone 60 and is considered to constitute a moving stream. This movement aids in heat transfer and melting of the charge which melting is considered ablative. The movement carries the ablatively melted charge to the fluxing zone. The movement should be relatively rapid so as to satisfy the requirements herein set forth but extremely high flow rates can introduce problems via extremely turbulent flow conditions which can cause oxidation losses.

The charging zone 60 and the fluxing chamber 80 are shown as separate or distinct zones separated by partition 84 whereby the charging occurs on one side of the partition and the fluxing on the other. However, such is not necessarily intended as a limit on the invention as it is possible to apply fluxing gas to the charging chamber 60 and the metal passing therethrough. However, it is preferred to allow at least some time after charge immersion to assure melting of the solid charge since the fluxing action is of little or no benefit until the charge is liquified. The slightly spaced separate zones depicted in FIG. 2 are useful in this respect. Also, as explained below, the oxides and other contaminants removed form a floating skim layer and such could interfere with or complicate immersion of the charge feed. Hence it is usually preferable to have separate or distinct zones or chambers as shown in FIG. 2 to facilitate separate melting and fluxing operations which are spaced but extremely closely and controlled timewise with respect to the movement of molten metal and freshly melted charge.

As already indicated, the time at which fluxing is initiated on the freshly liquified charge metal is of substantial importance in practicing the invention. In its broadest sense the invention contemplates treatment with the gaseous fluxes being initiated in advance of substantial chemical reduction of aluminum reducible oxide impurities in the charge so as to, by the fluxing treatment, remove the oxides from reactivity with the aluminum thereby substantially decreasing chemical reduction of the impurities. In a general sense the invention contemplates that the charge be exposed to the fluxing action substantially immediately upon melting or liquification by which is meant substantially concurrent with or as soon after melting as practicable, for instance within 60 seconds after melting and preferably within 30 seconds or, still better, not more than 15 seconds after melting. Highly preferred practices contemplate fluxing within as little as 5 seconds after melting. The times referred to apply to the initiation of fluxing rather than the completion thereof.

While the invention is described as contemplating the initiation of fluxing within a time related to the instant of melting, it is apparent that the exact instant of melting can be inconvenient to determine and hence the invention is described in terms more easily related to conveniently observable events such as immersion. There is some finite time passage between immersion and melting and accordingly one embodiment of the invention contemplates a finite time increment of ½ or 1 second, typically 2 or 3 seconds, up to 15 seconds before fluxing to allow for melting. Nonetheless the invention is described as contemplating initiating the fluxing action substantially immediately upon, or concurrent with, immersion as meaning as soon as practicable after immersion, preferably allowing for the above-mentioned optional and often preferred initial time allowance for melting. For example, fluxing in accordance with the invention is initiated not more than 60 to 75 seconds after immersion. Preferred practices contemplate fluxing not more than 30 to 40 seconds after immersion or, still better, not more than 15 or 20 seconds after immersion.

The desired times to initiate fluxing are readily accomplished in the arrangements herein described and, while not necessarily limited thereby, can be viewed as based on residence or hold times by which is meant the average or mean residence time of the molten metal as it travels through the system, it being understood that isolated miniscule portions or molecules may vary significantly from that average or mean without substantial effect on the practice of the invention. That is, the invention is described with respect to practically observable and measurable factors and an attempt is made to relate the invention in such readily understood and practical terms. Also it is to be understood that the time recitations and limits are described in the sense of a continuous process and are not necessarily intended to suggest time separated or spaced sequential effects. That is, the molten metal is normally moving continuously through the charging zone or chamber 60 and into the fluxing zone 80. The moving molten metal contacts the scrap feed or other charge in the charging zone 60 and melts it and transports the melted charge into the fluxing zone 80. Liquification of the charge and transfer thereof to the fluxing zone are effected within the designated times. As just stated, the attempt here is made to relate these times to an observable event, i.e. immersion, although in its broadest sense what the invention really contemplates is the initiation of fluxing substantially immediately upon melting or a very short time thereafter, preferably as short a time as is practicable.

The discussion immediately preceding was directed to the time for the initiation of fluxing and attention is now focused on the less important aspect of time for completion of the fluxing operation. It is desirable in practicing the invention that substantially all of the fluxing be accomplished within an average of 90 seconds after initiation of fluxing, and preferably 60 seconds or less. Also a preferred practice contemplates that fluxing be completed within 120 or 150 seconds or, better yet, within 90 seconds after immersion of the charge. Thus considering both initiation and completion of fluxing, it is initiated within 60 or 75 seconds, preferably less, after immersion and preferably completed not more than an average of 120 seconds after immersion with preferred practices as described herein providing for shorter times.

Further with respect to the respective times for melting and for initiation of fluxing, it has to be understood that such are readily discussed somewhat separately where the charge is of such a character, i.e. relatively fine, as to completely melt very rapidly. By relatively fine is meant of relatively thin cross section. For the most part this is the type of scrap which carries most of the contaminants on a weight percent basis since most of the contaminants here described adhere to the surface and the greater the surface per unit weight the greater the contamination, and this is the type of charge which melts more rapidly. However in a broader sense the invention contemplates charge of somewhat larger size or bulk density and even that such a charge be contaminated throughout with the types of impurities described above, for instance titanium dioxide, silicon dioxide and calcium oxide. Such a charge could be the product of compaction, briquetting or other procedures performed on finer pieces, and the resulting briquettes or larger pieces would require a substantial time passage in order to melt through their entire cross section. Nonetheless the invention contemplates that at least for those portions melted, i.e. those closer to the surface of a given charge piece, which portions constitute major portions of the charge, that fluxing be initiated within the time periods here described. Such an embodiment would contemplate fluxing as described in connection with finer pieces but that such occurs concurrently with the melting of other portions further removed from the surface which other portions can also be major portions. That is, considering an individual briquette introduced into the system its surface portions are liquified within a very short time and those portions are substantially immediately in accordance herewith fluxed. Of course, the subsequently melting portions are likewise fluxed substantially immediately upon melting but the melting of the internal portions and the fluxing of the earlier melted external portions derived from a briquette can occur concurrently. For instance the melting of the internal portions of the briquette just mentioned could still be taking place in the melting chamber or zone 60 or in the fluxing zone 80 while the external and first melted portions are being fluxed in the fluxing chamber 80. Such a fluxing chamber should, of course, allow for sufficient fluxing of the internal or last to melt portions where those inner portions also are contaminated.

Within the fluxing zone 80 the newly melted scrap feed as it is carried by the movement of the recirculated molten metal is promptly exposed to the action of the fluxing gases which, it has been found, effectively remove the titanium and silicon dioxides and calcium oxide contaminants from the molten aluminum and accordingly the molten aluminum cannot reduce these oxides to their respective metals which would dissolve in and contaminate the molten aluminum. Also removed or partially removed are oxides of aluminum and magnesium which become suspended as a result of the melting operation or are otherwise present, and this is advantageous particularly in a recirculatory system and especially with a dirty type of charge which would be expected to generate a significant amount of skim. The separated impurities and oxides form skim layer 90 which floats on the molten aluminum moving through the fluxing zone 80 and an elevated channel outlet 92 is provided for periodic removal of the skim which can be effected by automatic or manual means not shown. In the roof or covered portion of the fluxing zone 80 there are shown openings 94 through which heating means are employed. The heating means here are not especially substantial since the dominant purpose of heating at this point is simply to keep the skim layer 90 relatively hot, above the melting temperature of aluminum, to facilitate drainage therefrom of molten aluminum values entrained therein which would otherwise solidify and be trapped in the skim removed from skim outlet 92. Thus the fluxing is suitably carried out without external heat application to the molten metal although there may be a secondary heating applied to the skim to facilitate drainage therefrom of entrained aluminum.

Referring to the fluxing gases, what is contemplated is that a non-reactive gas, preferably along with a reactive chlorinaceous or other suitable halogen gas, be bubbled through the molten aluminum in the fluxing chamber. The chlorinaceous gas where employed may be a vaporous chloride such as aluminum chloride or hexachloroethane or any suitable source of active chlorine although chlorine is preferred because of availability and ease of handling, is provided in conjunction with a non-reactive gas flux. While a chlorinaceous gas, especially chlorine, is preferred, other halide or halogen gases suitable in fluxing molten aluminum can also be utilized. These gases include boron tetrafluoride and fluorine but these are less preferred than the chlorinaceous gas since they present health hazards.

The non-reactive gas flux may be any of those commonly designated as inert gases such as helium, neon, argon, krypton, xenon and mixtures thereof although argon is preferred for reasons of cost and availability. Also nitrogen or carbon dioxide can be employed as the non-reactive gas provided that proper measures are taken to avoid the formation of carbides or nitrides.

While, particularly where the charge is relatively clean, the non-reactive fluxing gas alone can remove the $TiO_2$ and $SiO_2$ and $CaO$ impurities, it is preferred to also use the chlorinaceous or other halogen gas which furthers the fluxing action and also improves the removal of other contaminants. Where both gas types are used the relative proportion of the respective gases can be varied widely within the practice of the invention, although higher amounts of the non-reactive gas are favored since the removal of Ti, Si and Ca oxides is mainly effected by the non-reactive gas. For instance proportions of the chlorinaceous gas as small as 1 or 2 percent, or even as little as one-half or one-tenth percent by volume and as high as 50 percent by volume are contemplated, the balance being the non-reactive gas. A mixture of 2 to 10 percent chlorine in argon is quite suitable. The gases are preferably blended before introduction to the fluxing chamber 80. That is, premixing the respective gases and introducing that mixture through all of the dispersers 86 is considerably preferable to introducing the halogen or chlorinaceous gas through some dispersers and the non-reactive gas through other dispersers. In general the total amount of fluxing gas is related to the amount of metal being treated and rates of 0.005 to 0.1 standard cubic feet of gas per pound of aluminum melted are contemplated in practicing the invention. Both the amount of the gas and the proportion of chlorine are related to the character of the scrap to be melted, the higher levels of dirt or contamination being accorded higher amounts of fluxing gas and richer chlorine levels in that gas.

As far as materials of construction are concerned and referring to FIG. 2, the material in contact with molten aluminum such as the materials defining inlet 62, outlet 82, melting zone 60, baffle 84 and fluxing zone 80 should be substantially refractory to molten aluminum such as silicon carbide or any of the refractory materials known to be suited for use in contact with molten aluminum. The fluxing gas dispersers 86 can be fashioned from porous graphite or other porous material which is substantially refractory to molten aluminum. Alternately, sparging tubes or other known means of bubbling a gas through molten aluminum can be employed. A porous media such as graphite offers advantages with respect to achieving a widespread distribution of small bubbles which obviously favor maximum fluxing effects with minimum gas consumption. Speaking further of the production of small bubbles and their distribution in the fluxing zone or chamber, it can be advantageous in some instances to employ one or more mechanical agitators such as a rotating vaned turbine impeller operated at a moderate rotational speed of say 100 to 400 rpm and situated in the lower regions of the fluxing compartment or zone in the proximity of the fluxing gas introduction sites. This effect tends to produce small bubbles and to distribute them widely throughout the molten metal and accelerate the fluxing action. Relatively low rotational speeds are favored since they minimize disturbance of the surface and any attendant skim ingestion effects. For a 12 inch diameter vaned impeller a rotational speed of about 150 to 200 rpm would probably strike a suitable balance between good fluxing action and minimum surface disturbance.

From the foregoing it can be seen that in its broadest sense the improvement contemplates the use of the system shown in FIG. 2 in any melting operation where scrap feed is introduced and melted into a body of molten aluminum from which molten metal is removed and replenished and, at least in that sense the molten metal is moving at the charge introduction site. It is particularly suited, however, to the type of operation depicted in FIG. 1 wherein the charging chamber 16 would be replaced with the arrangement 50 shown in FIG. 2 including the charging zone 60 and fluxing zone 80. That is, the pump discharge at 15 in FIG. 1 would be introduced via line 62 into the charging zone 60 of FIG. 2 and the fluxing zone discharge 82 in FIG. 2 would run into return line 18 in FIG. 1 for introduction into the heating chamber 12 in FIG. 1. The advantages of the present invention in such a system are based on higher melting rates and greatly extended operation periods without interruption caused by accumulation of skim and other contaminants in either the heating chamber, the pump or the charging site. As explained much earlier in this description, an accumulation of skim in the heating chamber 12 drastically reduces heat transfer, and attendant melting rates, and even deteriorates the structure of the chamber in that heat rejected by the molten metal must be absorbed by the surrounding structure. Experience has shown that a 2-inch thick skim layer in heating bay 12 reduces heat transfer and fuel energy efficiency by approximately 50 percent. Two inches of skim is not uncommon in continuous loop melting systems like that shown in FIG. 1. Also, the pump 20 can suffer from oxide contamination in that the oxides tend to be abrasive and damage the internals of the pump. In the charging chamber oxides and skim can interfere with charging rate. By immediately eliminating skim and other contaminants substantially immediately upon melting of the charge, skim circulation is substantially avoided and equipment life and operation smoothness is greatly enhanced. Further and referring particularly to reclaimed can scrap as the source of metal charge to the system, the present improvement avoids contamination by titanium and silicon and the attendant necessity to add non-recycled or pure metal to compensate for the higher levels of these metals. Thus the present improvement greatly enhances the recycling of this valuable but otherwise troublesome source of aluminum metal.

Referring in more detail to the particular type of charge contemplated, the present improvement is particularly suited to the recycling of more or less divided charge which may be termed fines, but in a rather broad sense. A typical feed would be that derived from reclaiming used aluminum cans and recovering scrap produced in manufacturing cans, all generically termed can scrap. Such can scrap typically comprises bits and pieces of aluminum can material which can vary from rather small particles of 1/16 of an inch or so up through elongated shred-like pieces, skeletal scrap remaining after container panels are stamped out, bent, crumpled or smashed portions of an aluminum can or, for that matter, an entire can smashed into a plate-like form or crumpled like a bent plate or crumpled piece of paper. Many times that larger pieces are themselves pierced or broken in the handling or treatment of the cans as in delacquering where the cans are exposed to organic volatile solvents or to high temperature gases and they are often punctured to aid solvent or hot gas distribution through the bulk of the can mass. Can scrap is usually derived from metal thicknesses within the range of about 0.004 to about 0.020 inch although thinner and thicker gauges of about 0.001 or 0.002 to about 0.030 inch are not very unusual. While the invention is particularly suited to can scrap and similar charges, it should be suited to other types of feed or charge comprising crushed sheet shapes including random sized shapes of sheet type products in various stages of tearing or smashing and typically comprising small platelet-like particles, shreds and other tear produced chips or fragments, punctured or otherwise torn or distorted pieces and even larger, more complex shapes measuring several inches as derived from crushing an article such as a cup or drawn container shaped from a sheet or a larger crushed or distorted shape such as a portion of an automotive panel which could be folded, severed or otherwise distorted in reclamation. In its broadest sense the invention contemplates feed scrap of any source, even turnings and chips associated with machining operations, although this class of feed is usually less contaminated with dirt and other foreign material than reclaimed products involved in packaging and other applications where the metal is passed through a distribution chain to an ultimate consumer who later discards it along with other refuse. Reclaiming the aluminum from such a source involves difficulty in that the aluminum is often highly contaminated with food products, dirt, and various sundry foreign materials all of which seriously interfere with melting operations. The feed can be exposed or subjected to various levels of treatment prior to melting in order to minimize melting problems. For instance can scrap can be delacquered by exposing it to a solvent such as acetone capable of removing substantial portions of the lacquer. Nonetheless the residual levels of lacquer, pigment, dirt and other contaminants remaining after such treatments are often highly undesirable in the sense of introducing foreign materials into a melt and even these reduced levels of contamination are difficult to cope with especially where a recirculating type melting system of the type shown in FIG. 1 is used. Thus the feed charge can comprise lacquered or delacquered can or other scrap, especially sheet scrap. Furthermore there is a desire to avoid some of the pretreatment operations for the sake of economies and the present invention offers some relief in that higher levels of contaminants are tolerated in the feed. Accordingly, the invention contemplates feed comprising divided aluminous materials, particularly of sheet-like or platelet form, which includes aluminous material having relatively large surface areas and typified by a bulk density level of 0.5 to 100 lbs. per cubic foot. Basically the invention is suited to any charge, the individual pieces of which fit inside a 12 inch cube and which will not sink by gravity when placed on the molten metal.

Obviously fine particles fall within this class but also larger pieces such as those just described tend to fall into this category. Such a charge typically contains the crushed can and crushed sheet shapes discussed above but can include other materials as also described herein. Also, the invention contemplates feed containing significant amounts of contaminants including titanium, silicon, calcium, carbon residual organic solvents, lubricants, or coatings and other contaminants which normally cause serious problems in melting operations. Further, in addition to the titanium, silicon and calcium oxides the invention in a broader sense contemplates other non-metallic impurities which are reduced or reacted by molten aluminum to produce soluble or partially soluble metal impurities in the aluminum. Such impurities can be present in as small an amount as one-fourth or one percent in the charge and the invention will substantially improve the melting operation by removing these contaminants from intimate relationship with the molten aluminum before they can be reduced by the molten aluminum. There are the very classes of feed to which the invention can be applied with most beneficial results. Nonetheless the invention offers advantages in connection with any scrap containing even lesser amounts of contaminants since, especially referring to the recirculatory melting systems of the type shown in FIG. 1, these systems are extremely sensitive to contamination for the reasons already explained.

To illustrate the improvement, the following example proceeds. Delacquered recycled can stock of alloy 3004 and 5182 was melted in a recirculating system of the type depicted in FIG. 1, but not employing the present improvement. Alloy 3004 is commonly employed in can bodies and nominally contains 1.2% Mn and 1% Mg, balance aluminum. Alloy 5182 nominally contains 4.5% Mg and 0.35% Mn, balance aluminum. This scrap obtained from can recycling centers typically contained about 1½% $TiO_2$ and around 2 to 4% $SiO_2$. After extended periods of running, the molten metal derived from the melting operation contained approximately 0.10% Ti and about 0.60% Si. Incorporation into the system shown in FIG. 1 of the improved method according to FIG. 2 wherein a fluxing bay or chamber is situated immediately adjacent the charging site such that fluxing is initiated substantially immediately upon melting or very quickly after immersion of the metal charge pieces, in the particular system involved in an average of about 14 seconds to allow for melting. The titanium content in the molten metal thus produced was only 0.04 percent and the silicon content was 0.22 percent. The base metal included in the charge contained approximately these levels of titanium and silicon which indicates that all or substantially all of the $TiO_2$ and $SiO_2$ contaminants were removed or at least prevented from reacting with aluminum to introduce titanium and silicon metal impurities into the melt.

While the invention has been described in terms of preferred embodiments, the claims appended hereto are intended to encompass all embodiments which fall within the spirit of the invention.

Having thus described out invention and certain embodiments thereof, we claim:

1. A method of melting aluminum charge containing ¼ percent or more metallic oxide impurities from the group consisting of the oxides of Ti, Si and Ca, said oxides being reducible in molten aluminum to produce metallic impurities, the method comprising:
   1. submerging said charge into molten aluminum at a temperature superheated with respect to the melting temperature of said charge thereby to melt said charge; and
   2. treating said molten charge contained therein with a fluxing gas comprising a nonreactive gas, said treatment being initiated within 75 seconds after submergence of said charge and in advance of substantial chemical reduction of said oxides by said aluminum thereby to remove said oxides from reactivity with said aluminum and substantially decrease the reduction thereof by said aluminum.

2. A method of melting aluminum charge containing ¼ percent or more metallic oxide impurities from the group consisting of the oxides of Ti, Si and Ca, said oxides being reducible in molten aluminum to produce metallic impurities, the method comprising:
   1. submerging said charge into a moving stream of molten aluminum which is at a temperature superheated with respect to the melting temperature of said charge to melt said charge; and
   2. treating said melted charge with a fluxing gas comprising a non-reactive gas, said fluxing treatment initially being applied to said melted charge within 75 seconds after said charge is submerged, thereby to remove said oxide impurities from said molten aluminum and prevent substantial reduction thereof by said molten aluminum.

3. A method of melting a charge comprising particulate aluminum charge containing ¼ percent or more metallic oxide impurities from the group consisting of the oxides of Ti, Si and Ca, said oxides being reducible in molten aluminum to produce metallic impurities, the method comprising:
   1. submerging a continuously provided supply of said charge into a moving stream of molten aluminum which is at a temperature superheated with respect to the melting temperature of said charge to heat said charge and provide melted charge portions in said molten aluminum; and
   2. relatively rapidly moving said molten aluminum, and said melted charge portions into a fluxing zone to contact said melted charge portions with a fluxing gas comprising a non-reactive gas, said fluxing being initially applied to said charge within 75 seconds after said charge is submerged, thereby to remove said oxide impurities from said molten aluminum and prevent substantial reduction thereof by said molten aluminum.

4. The method according to claim 3 wherein said aluminum charge comprises can scrap.

5. The method according to claim 3 wherein the charge is melted within 15 seconds and fluxing is initiated within 30 seconds of immersion of said charge.

6. The method according to claim 3 wherein the fluxing action is completed within 120 seconds after immersion of said charge.

7. The method according to claim 3 wherein said moving stream of molten aluminum is superheated to a temperature of 100° to 300°F above the melting temperature of said aluminum feed charge.

8. The method according to claim 3 wherein the temperature of said molten aluminum in said moving stream ranges between 1250° and 1700°F.

9. The method according to claim 3 wherein the temperature of said molten aluminum in said moving stream ranges between 1300° and 1500°F.

10. The method according to claim 3 wherein the temperature of said molten aluminum in said moving stream ranges between 1400° and 1450°F.

11. The method according to claim 3 wherein the amount of molten aluminum in said stream ranges from 10 to 50 times the amount of said feed charge on a weight basis.

12. The method according to claim 3 wherein the amount of molten aluminum in said stream ranges from 15 to 25 times the amount of said feed charge on a weight basis.

13. The method according to claim 3 wherein portions of said charge are melted and the fluxing thereof initiated while other portions are not yet melted, the fluxing of all portions nonetheless being initiated substantially immediately upon the melting thereof.

14. The method according to claim 3 wherein said gaseous flux also comprises a chlorinaceous gas in amounts of 0.1 to 50 percent, the balance being the non-reactive gas.

15. The method according to claim 3 wherein said fluxing is initiated within 30 seconds after immersion of said charge.

16. The method according to claim 3 wherein said fluxing is initiated within 15 seconds after immersion of said charge.

17. The method according to claim 3 wherein said fluxing is initiated within 5 seconds after melting of said charge.

18. A method of melting aluminum can scrap, said can scrap being contaminated with ¼ percent or more of impurities selected from the group consisting of oxides of Ti, Si and Ca, said oxide impurities being reducible by molten aluminum to produce metallic impurities, the method comprising
  1. immersing a continuously provided charge of the said can scrap into a moving stream of molten aluminum superheated with respect to said charge and at a temperature of 1300° to 1500°F and provided in an amount ranging from 10 to 50 times the amount of said charge on a weight basis, whereby said superheated molten aluminum rapidly melts said charge; and
  2. moving said molten aluminum and the melted charge from the site of said introduction and into a fluxing zone wherein it is subjected to a fluxing gas passing therethrough said gas comprising a non-reactive gas and a reactive chlorinaceous gas, said fluxing action being initiated within 60 seconds of the immersion of said charge and being completed within 150 seconds after said immersion of said charge, thereby to remove said impurities from said molten aluminum and prevent substantial reduction thereof by said molten aluminum.

19. In a system of melting an aluminum charge containing ¼ percent or more metallic oxide impurities from the group consisting of the oxides of Ti, Si and Ca, said oxides being reducible in molten aluminum to produce metallic impurities, and wherein molten aluminum is continuously circulated from a heating station to a charging station and back, and where said molten aluminum is heated to a temperature which is superheated with respect to said charge in said heating station, and where aluminum charge is introduced to said molten aluminum in said charging station and melted by the superheat in said molten aluminum and wherein melted charge and said molten aluminum are moved to said heating station and where a melted aluminum product is substantially continuously removed commensurate with the amount of charge introduced to the system, the improvement wherein:
  1. said charge is submerged substantially continuously into said superheated molten aluminum; and
  2. said molten aluminum and the melted charge contained therein are subjected to a fluxing gas comprising a reactive chlorinaceous gas and a non-reactive gas, said fluxing action being initially applied to said melted charge within 75 seconds after its submergence, thereby to remove said oxide impurities from said molten aluminum and prevent substantial reduction thereof by said molten aluminum.

20. A method of melting aluminum can scrap charge containing ¼ percent or more metallic oxide impurities from the group consisting of the oxides of Ti, Si and Ca, said oxides being reducible in molten aluminum to produce metallic impurities, the method comprising
  forcibly submerging a substantially continuously provided charge of said scrap into a moving stream of molten aluminum which is at a temperature superheated with respect to the melting temperature of said scrap charge, relatively rapidly moving said molten aluminum past the site of said scrap charge introduction and into a fluxing zone wherein the molten aluminum stream including the newly melted scrap charge is contacted by a fluxing gas comprising a reactive halogen gas and a non-reactive gas, the fluxing action of said gases being applied to said melting scrap charge within 75 seconds of the submergence of said scrap charge, thereby to remove said oxide impurities from said molten aluminum and prevent substantial reduction thereof by said molten aluminum.

21. In a system for recycling aluminum scrap metal wherein said scrap is collected and, with or without pretreatment to remove contaminants therefrom, melted and solidified in the production of aluminum products, said aluminum scrap metal at the time of melting being contaminated with ¼ percent or more of one or more oxide impurities selected from the group consisting of $TiO_2$, $SiO_2$ and $CaO$, said oxides being reducible in molten aluminum to produce metallic impurities, the improvement wherein said aluminum scrap is continuously introduced to a circulatory melting system wherein molten aluminum is continuously circulated from a heating station to a charging station and back, and wherein said scrap is continuously immersed in molten aluminum circulating within said circulatory melting system, the molten aluminum being superheated with respect to said scrap whereby to provide melted charge, the molten aluminum, prior to returning to the heating station, being relatively rapidly moved from the site of said immersion of said scrap to a second site where it is subjected to treatment by a fluxing gas comprising a reactive chlorinaceous gas and a non-reactive gas, said fluxing treatment being initiated within 60 seconds after immersion of said charge, thereby to remove said oxide impurities from said molten aluminum and prevent substantial reduction thereof by said molten aluminum.

22. In a system of melting an aluminum charge containing ¼ percent or more metallic oxide impurities from the group consisting of the oxides of Ti, Si and Ca, said oxides being reducible in molten aluminum to produce metallic impurities, and wherein molten aluminum is continuously circulated from a heating station where it is superheated to a charging station where solid aluminum charge is introduced to said superheated molten aluminum and melted by superheat in said molten aluminum and wherein melted aluminum is substantially continuously removed commensurate with the amount of charge introduced to the sytem, the improvement wherein 1. said charge is immersed substantially continuously into a first chamber where it contacts the moving superheated molten aluminum to provide melted charge; and
2. said molten aluminum and the charge introduced thereinto is relatively rapidly moved into a second chamber wherein said melted charge in said moving superheated molten aluminum is subjected to a fluxing gas comprising a reactive chlorinaceous gas and a non-reactive gas, said second chamber being spaced from but in close proximity to said first chamber whereby said fluxing action is initially applied to said charge within 75 seconds after its immersion in said first chamber, thereby to remove said oxide impurities from said molten aluminum and prevent substantial reduction thereof by said molten aluminum.

* * * * *